US006588767B2

(12) United States Patent
Kane

(10) Patent No.: US 6,588,767 B2
(45) Date of Patent: Jul. 8, 2003

(54) MAT GASKET FOR FLUID CONDUITS

(75) Inventor: William L. Kane, Somonauk, IL (US)

(73) Assignee: Cascade Waterworks Manufacturing Co., Yorkville, IL (US)

( * ) Notice: Subject to any disclaimer, the term of this patent is extended or adjusted under 35 U.S.C. 154(b) by 0 days.

(21) Appl. No.: 09/904,028

(22) Filed: Jul. 12, 2001

(65) Prior Publication Data

US 2003/0011142 A1 Jan. 16, 2003

(51) Int. Cl.[7] ................................................ F16L 17/06
(52) U.S. Cl. .................... 277/611; 277/612; 277/626; 285/197
(58) Field of Search ................. 277/611, 612, 277/626; 285/197–9; 137/317, 318

(56) References Cited

U.S. PATENT DOCUMENTS

| 105,907 A | * | 8/1870 | Clark ........................ 285/197 |
| 873,689 A | | 12/1907 | Van Winkle |
| 2,693,975 A | * | 11/1954 | Smith ........................ 277/623 |
| 2,795,439 A | * | 6/1957 | Smith ........................ 285/110 |
| 3,032,062 A | * | 5/1962 | Blahnik ..................... 137/362 |
| 3,191,950 A | * | 6/1965 | Hiltner ...................... 264/273 |
| 3,204,665 A | | 9/1965 | Faint .......................... 138/99 |
| 3,471,176 A | | 10/1969 | Gilchrist ..................... 285/111 |
| 3,622,184 A | * | 11/1971 | Deasy et al. ........... 285/148.26 |
| 3,635,503 A | * | 1/1972 | Rafalski et al. ............. 285/197 |
| 3,836,183 A | * | 9/1974 | Battle ......................... 277/612 |
| 3,840,255 A | | 10/1974 | Daghe .......................... 285/45 |
| 3,863,937 A | * | 2/1975 | Silverman et al. .......... 277/317 |
| 4,018,464 A | | 4/1977 | Acda et al. ................. 285/197 |
| 4,059,291 A | | 11/1977 | Acda et al. ................. 285/197 |
| 4,073,513 A | * | 2/1978 | Blakeley ................... 285/136.1 |
| 4,350,371 A | | 9/1982 | Lochte et al. ................. 285/18 |
| 4,368,894 A | | 1/1983 | Parmann |
| 4,441,744 A | * | 4/1984 | Oostenbrink et al. ....... 277/606 |
| 4,482,161 A | * | 11/1984 | Izzi, Sr. ..................... 277/606 |
| 4,494,780 A | * | 1/1985 | Burnett ................... 285/148.26 |
| 4,611,835 A | * | 9/1986 | Gittleman ................. 285/125.1 |
| 4,664,428 A | | 5/1987 | Bridges ....................... 285/373 |
| 4,708,373 A | * | 11/1987 | Morriss, Jr. ................. 277/616 |
| 4,895,397 A | | 1/1990 | Miller ......................... 285/419 |
| 5,040,828 A | | 8/1991 | Kane .......................... 285/197 |
| 5,145,216 A | * | 9/1992 | Valls, Jr. .................. 285/140.1 |
| 5,170,813 A | * | 12/1992 | Francis .................... 137/15.13 |
| 5,806,896 A | | 9/1998 | Sato et al. ..................... 285/2 |
| 6,173,967 B1 | | 1/2001 | Eskew et al. ............... 277/606 |
| 6,250,687 B1 | * | 6/2001 | Voigt ....................... 156/273.9 |
| 6,412,824 B2 | * | 7/2002 | Kunsman ................... 285/197 |

OTHER PUBLICATIONS

Robar Industries Ltd. Product Information Effective Sep. 15, 1982, 2606 Service Saddles.

JMC Industries, Inc. Price Book Dated Jan. 3, 1989, JMC 114 Mechanical Joint Repair Sleeve.

Dresser Industries, Inc. Price List Form 877–E Rev. 1186, Style 126 Bell–Pack Sleeves.

* cited by examiner

Primary Examiner—Anthony Knight
Assistant Examiner—Alison K. Pickard
(74) Attorney, Agent, or Firm—Emrich & Dithmar

(57) ABSTRACT

A mat gasket for use with a tapping saddle is disposed about an aperture in a main fluid conduit and is further disposed between and in sealed contact with the main fluid conduit and an outer sleeve member. The mat gasket includes an aperture aligned with the aperture in the main fluid conduit and outer and inner portions in sealed contact with the outer sleeve member and the main fluid conduit, respectively. The mat gasket's inner portion is provided with a waffled surface and includes spaced ribs concentrically disposed about and in closely spaced relation to the aperture in the gasket and a pair of opposed, tapered edges. The mat gasket's outer portion is provided with a pair of concentric O-rings disposed about the gasket's aperture for engaging the outer sleeve member in a sealed manner.

7 Claims, 2 Drawing Sheets

MAT GASKET FOR FLUID CONDUITS

FIELD OF THE INVENTION

This invention relates generally to sealed connections for fluid conduits and is particularly directed to gaskets for connecting a tapping saddle or branch to a fluid conduit in a sealed manner.

BACKGROUND OF THE INVENTION

Tapping saddles are used in fluid bearing conduits to support an extension pipe positioned in close proximity to and in alignment with a hole tapped in a main supply conduit. The tapping saddle is typically provided in two sections adapted for attachment to the main supply conduit, with one shells section including the extension pipe, or side branching outlet. The outer shells sections are disposed around the main conduit and are secured together by means of bolts or welded-on studs. Various gasket arrangements are disposed between the two tapping saddle shells and the main conduit about the side opening in the conduit. The inner and outer surfaces of these types of gaskets are typically provided with an O-ring concentrically disposed adjacent to and about the aperture in the main conduit for providing a seal between the tapping saddle shells and the main conduit. These types of gasket arrangements have offered only limited sealing capability in prevent leaks in the tapping saddle installation. Examples of tapping saddle arrangements can be found in U.S. Pat. Nos. 873,689; 3,471,176; 3,840,255; 4,018,464; 4,059,291; 4,350,371; 4,708,373; 4,895,397; and 5,040,828.

The present invention addresses the aforementioned limitations of the prior art by providing a mat gasket for a tapping saddle having a steel ring reinforcing insert, a concentric rib seal on its inner surface, and a double O-ring seal on its outer surface.

OBJECTS AND SUMMARY OF THE INVENTION

Accordingly, it is an object of the present invention to provide an improved mat gasket for a tapping saddle disposed between an outer shell and an inner main conduit and further disposed about aligned apertures in the outer shell and the inner main conduit.

It is another object of the present invention to provide a tapping saddle of a fluid conduit having a mat gasket including a steel ring reinforcing insert, a concentric rib seal on its inner surface, and a double O-ring seal on its outer surface.

This invention contemplates a mat gasket for a tapping saddle disposed between an outer shell and an inner main conduit and further disposed about aligned apertures in the outer shell and the inner main conduit, the mat gasket comprising a flexible, compressible, resilient member having first outer and second inner opposed surfaces and an aperture therein, wherein the first outer surface engages the outer shell and the second inner surface engages the inner main conduit about the respective aligned apertures therein; a pair of concentric O-rings disposed on the first outer surface of the flexible, compressible, resilient member about and adjacent to the aperture therein, wherein the pair of concentric O-rings engage and form a double seal with the outer shell; and a generally circular ribbed portion disposed on the second inner surface of the flexible, compressible, resilient member about and adjacent to the aperture therein, wherein the generally circular ribbed portion engages and forms a seal with the inner main conduit.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawing, where like reference characters identify like elements throughout the various figures, in which:

DETAILED DESCRIPTION OF THE PREFERRED EMBODIMENT

Figure 1:
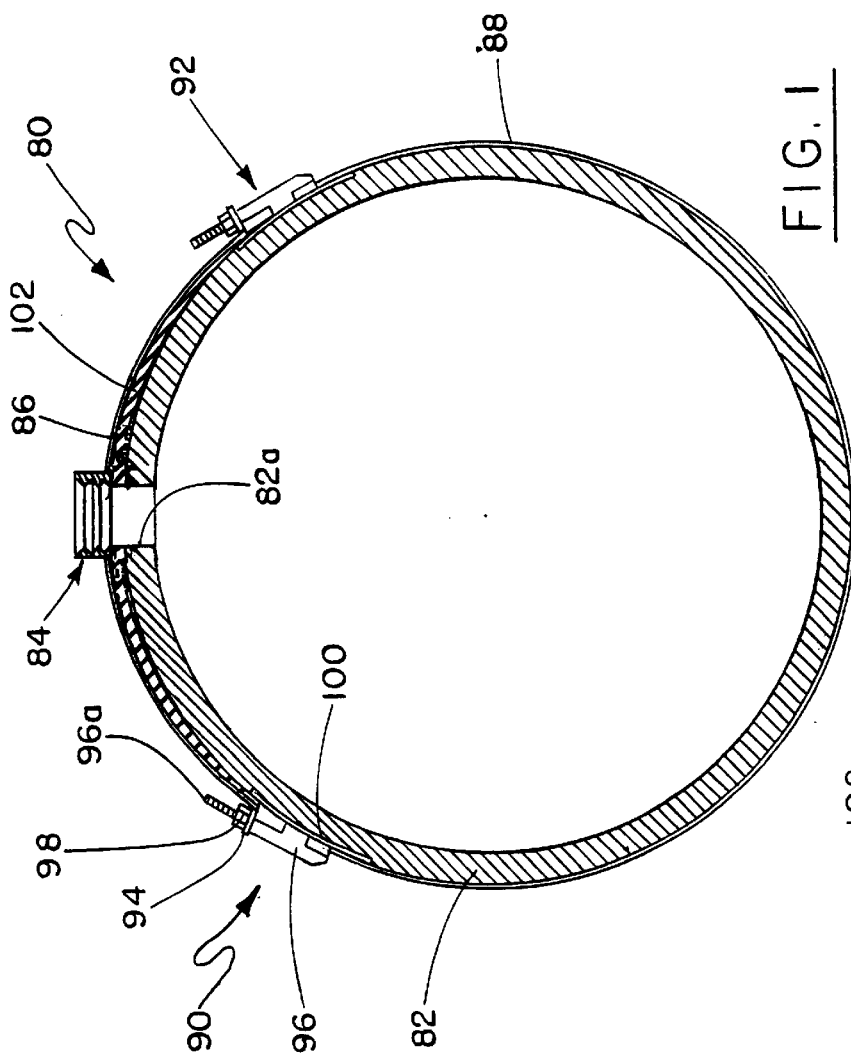
FIG. 1 is a sectional view of a tapping saddle arrangement incorporating a mat gasket in accordance with the present invention.

Referring to FIG. 1, there is shown a sectional view of a tapping saddle 80 incorporating a mat gasket 102 in accordance with the present invention. Tapping saddle 80 is used for incorporating a threaded tapping coupler 84 in a sealed manner adjacent an aperture 82a in a fluid conduit 82. Tapping saddle 80 includes an upper sleeve member 86 disposed about an upper portion of the fluid conduit 82 and a lower sleeve member 88 disposed about a lower portion of the fluid conduit. The upper and lower sleeve members 86,88 are securely coupled together and maintained in position about and in engagement with the fluid conduit 82 by means of first and second couplers 90 and 92. The first coupler 90 includes a coupling finger 96 attached to a receiver bar 100. Receiver bar 100 is, in turn, securely attached to an inner portion of the lower sleeve member 88. Attached to and extending from an upper portion of coupling finger 96 is a threaded stud 96a. Threaded stud 96a is adapted for insertion through an aperture in a washer plate 94 attached to the lowered edge of the upper sleeve member 86. Threaded stud 96a is maintained in position within the washer plate 94 by means of a nut 98. Tightening of nut 98 draws the upper and lower sleeve members 86,88 toward each other and also draws the upper and lower sleeve members more tightly about the fluid conduit 82. The second coupler 92 is identical in configuration and operation with the first coupler 90 as shown in FIG. 1 and a detailed description of the second coupler is thus omitted for simplicity. Sleeve members 86 and 88 are shown in FIG. 1 as disposed on upper and lower portions of fluid conduit 82, but these two shells may be disposed on side portions of the fluid conduit depending upon where the aperture 82a is located in the fluid conduit.

The upper sleeve member 96 as well as the mat gasket 102 each include respective aligned apertures for receiving the threaded tapping coupler 84. Tightening of the first and second couplers 90,92 not only draws the upper and lower sleeve members 86,88 toward one another, but also compresses the mat gasket 102 between the upper sleeve member and the fluid conduit 82. The configuration and operation of the mat gasket 102 as well as the manner in which the mat gasket forms a leak-proof seal between the fluid conduit 82 and upper sleeve member 86 and about the threaded tapping coupler 84 is described in detail in the following paragraphs.

Figure 2:
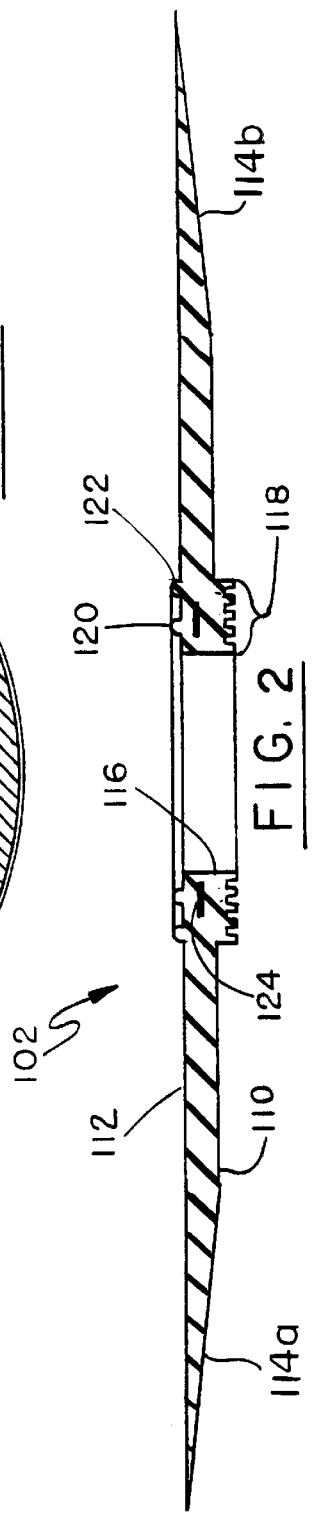
FIG. 2 is a sectional view of the inventive mat gasket shown in FIG. 1.

Referring to FIG. 2, there is shown a sectional view of the inventive mat gasket 102. Plan views of the inner and outer portions of the inventive mat gasket 102 are respectively shown in FIGS. 3 and 4.

Figure 3:
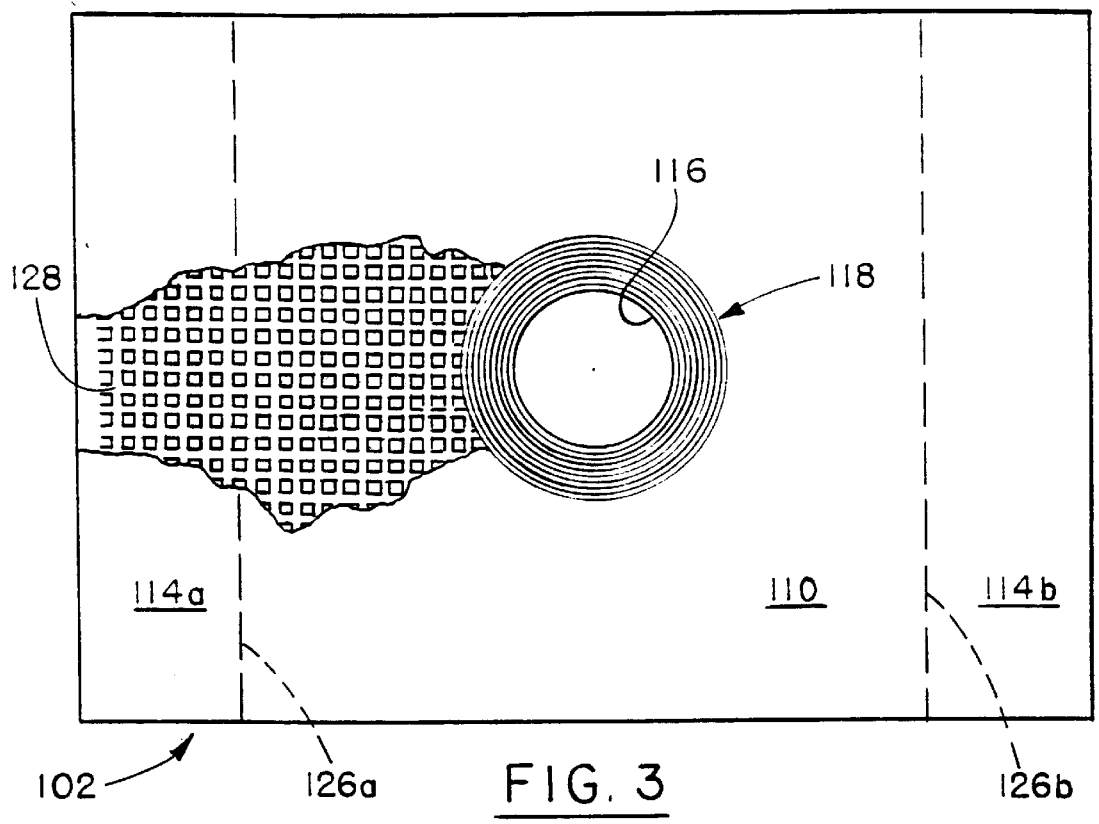
FIG. 3 is a plan view of the inner portion of the mat gasket shown in FIG. 2.
Figure 4:
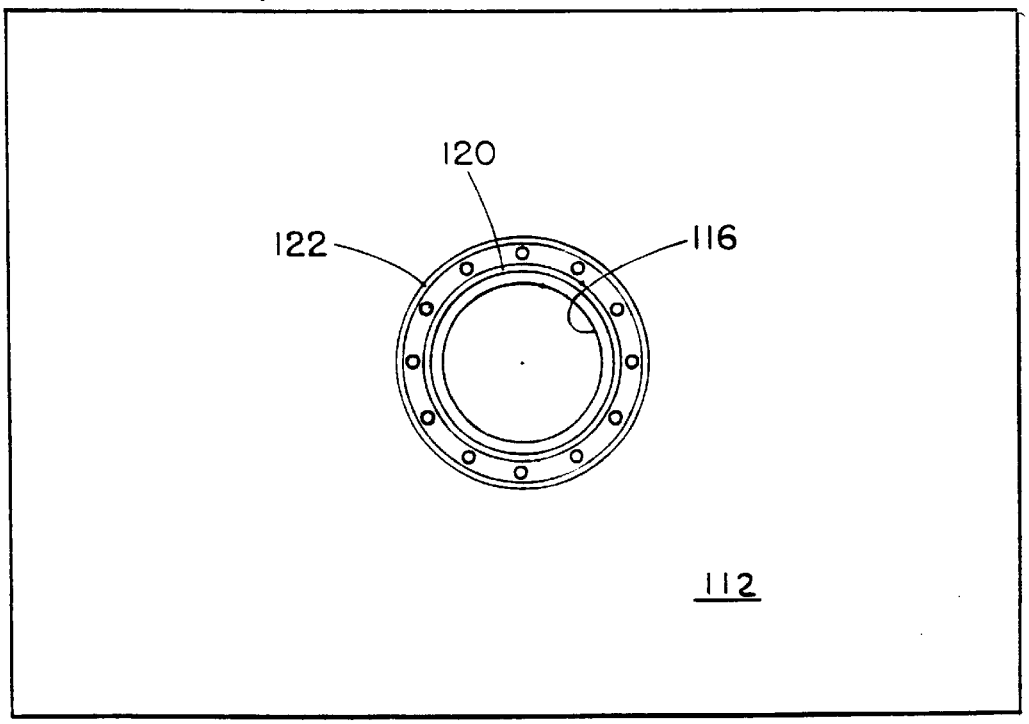
FIG. 4 is a plan view of the outer portion of the mat gasket shown in FIGS. 2 and 3.

Mat gasket 102 includes a flat inner portion, or surface, 110 and a flat outer portion, or surface, 112. Opposed, inner distal ends of the mat gasket 102 are provided with first and second tapered portions 114*a* and 114*b*. Disposed in the center of the mat gasket 102 is a circular aperture 116. Disposed about the circular aperture 116 and embedded within the mat gasket 102 is a flat stainless steel reinforcing ring 124. The inner portion of the mat gasket 102 immediately adjacent to and disposed about the aperture 116 therein is provided with a plurality of concentric, upraised ribs 118. Concentric ribs 118 engage and form a seal with the outer surface of the fluid conduit 82 immediately adjacent to and about the threaded tapping coupler 84. Disposed on the outer surface of the mat gasket 102 immediately adjacent to and about the aperture 116 therein are concentrically disposed inner and outer O-ring seals 120 and 122. The inner and outer O-ring seals 120,122 engage the inner surface of the upper sleeve member 86 immediately adjacent to and concentrically about the aperture therein to form a dual seal with the upper sleeve member. Mat gasket 102 is preferably comprised of a flexible, resilient, compressible material such as styrene butadiene rubber. Thus, when the first and second couplers 90,92 are tightened and the upper sleeve member 86 is drawn toward the fluid conduit 82, the concentric ribs 118 and inner and outer O-ring seals 120,122 become compressed and form leak-proof seals respectively with the fluid conduit and the upper sleeve member. As shown in FIG. 3, the inner portion of the mat gasket 102 is provided with a waffle-like grid pattern 128, with dotted lines 126*a* and 126*b* respectively showing where the flat inner portion 112 of the gasket ends and the first and second tapered outer portions 114*a* and 114*b* begin.

There has thus been shown a mat gasket for use with a tapping saddle which is disposed about an aperture in a main fluid conduit and is further disposed between and in sealed contact with the main fluid conduit and an outer sleeve member. The mat gasket includes an aperture aligned with the aperture in the main fluid conduit for receiving a tapping coupler. Concentrically disposed on the inner surface of the mat gasket about the tapping coupler are a plurality of upraised ribs for engaging the main fluid conduit in a sealed manner. Disposed on the outer surface of the mat gasket about the aperture therein are inner and outer concentrically disposed O-ring seals for providing a double seal with the outer sleeve member. The branch gasket and mat gasket are preferably comprised of a flexible, resilient, compressible elastomeric compound such as styrene butadiene rubber.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. A mat gasket for a tapping saddle disposed between an outer shell and an inner main conduit and further disposed about aligned apertures in said outer shell and said inner main conduit, said mat gasket comprising:

a flexible, compressible, resilient member having first outer and second inner opposed surfaces and a circular aperture therein, wherein said first outer surface engages the outer shell and said second inner surface engages the inner main conduit about the respective aligned apertures therein;

a pair of concentric O-rings disposed on the first outer surface of said flexible, compressible, resilient member about and adjacent to the aperture therein, wherein said O-rings engage and form a double seal with the outer shell;

a generally circular ribbed portion disposed on the second inner surface of said flexible, compressible, resilient member about and adjacent to the aperture therein, wherein said ribbed portion includes a plurality of circular upraised ribs concentrically disposed about and in a radially spaced manner from the aperture in said resilient member, and wherein said circular upraised ribs engage and form plural seals with the inner main conduit; and a grid pattern disposed about said circular upraised ribs on the second inner surface of said flexible, compressible, resilient member for engaging and forming a seal with the inner main conduit.

2. The mat gasket of claim 1 further comprising a metal reinforcing ring disposed in said resilient member about the aperture therein.

3. The mat gasket of claim 2 wherein said metal reinforcing ring is comprised of stainless steel.

4. The mat gasket of claim 1 wherein said circular ribbed portion and said pair of concentric O-rings are spaced from the circular aperture in said resilient member substantially the same radial distance.

5. The mat gasket of claim 1 wherein said flexible, compressible, resilient member is comprised of an elastomeric compound.

6. The mat gasket of claim 5 wherein said elastomeric compound is styrene butadiene rubber.

7. The mat gasket of claim 1 further comprising first and second opposed tapered distal edges on the second inner surface of said resilient member.

* * * * *